United States Patent [19]

Field et al.

[11] Patent Number: 4,505,296

[45] Date of Patent: Mar. 19, 1985

[54] FUEL PRESSURE REGULATOR

[75] Inventors: Martin J. Field, Churchville; Andrew J. Makusij, Fairport; Donald A. Rosin, Penfield, all of N.Y.

[73] Assignee: General Motors Corporation, Detroit, Mich.

[21] Appl. No.: 622,890

[22] Filed: Jun. 21, 1984

[51] Int. Cl.³ .............................................. F16K 31/12
[52] U.S. Cl. .................................. 137/510; 137/454.2
[58] Field of Search ................ 137/510, 505.41, 454.2, 137/454.6

[56] References Cited

U.S. PATENT DOCUMENTS

| | | | |
|---|---|---|---|
| 1,148,568 | 8/1915 | Bees | 137/510 X |
| 3,079,946 | 3/1963 | Rösler | 137/510 U X |
| 3,575,205 | 4/1971 | Caparone | 137/505.41 |
| 4,411,285 | 10/1983 | Oswell | 137/510 X |

Primary Examiner—Harold W. Weakley
Attorney, Agent, or Firm—C. K. Veenstra

[57] ABSTRACT

A fuel supply member surrounds the perimeter of a pressure regulator diaphragm and sealingly engages the pressure regulator base and the pressure regulator cover to completely enclose the perimeter of the diaphragm in the fuel supply system.

1 Claim, 1 Drawing Figure

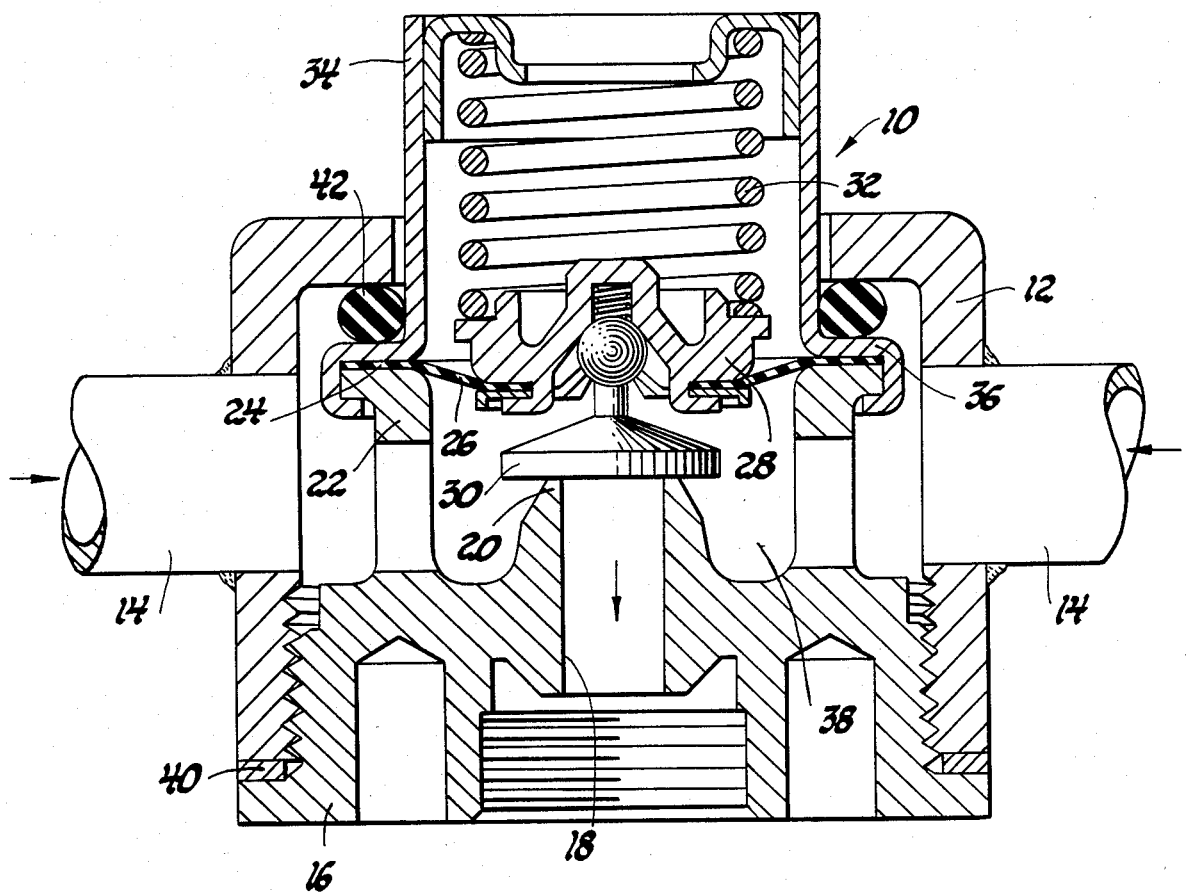

FUEL PRESSURE REGULATOR

TECHNICAL FIELD

This invention relates to a fuel pressure regulator employed in fuel injection apparatus.

BACKGROUND

In several prior fuel injection systems having a pump which supplies fuel to a fuel injector, the pump supplies more fuel than is required by the injector, and the excess fuel is discharged through a fuel pressure regulator represented, for example, by U.S. Pat. No. 3,511,270. The fuel pressure regulator has a diaphragm which balances the pressure of the fuel supplied to the injector with the bias of a pressure regulator spring. If the pressure of the fuel supplied to the injector is less than the spring bias, the diaphragm positions a valve to shut off the excess fuel flow and thus increase the fuel pressure at the injector; if the pressure of the fuel supplied to the injector exceeds the spring bias, the diaphragm retracts the valve to discharge the excess fuel and thus reduce the fuel pressure at the injector.

SUMMARY OF THE INVENTION

In the fuel pressure regulator provided by this invention, the perimeter of the pressure regulator diaphragm is completely enclosed by the fuel supply system. Thus with this invention, undue distortion of the diaphragm does not lead to loss of fuel from the fuel supply system past the perimeter of the diaphragm.

The details as well as other features and advantages of a preferred embodiment of this invention are set forth in the remainder of the specification and are shown in the accompanying drawing.

SUMMARY OF THE DRAWING

The sole FIGURE of the drawing is a sectional view of a fuel pressure regulator constructed according to this invention.

THE PREFERRED EMBODIMENT

Referring to the drawing, a fuel pressure regulator 10 has a fuel supply member 12 which receives fuel from a pair of fuel lines 14.

A pressure regulator base 16 is threaded into fuel supply member 12 and includes a fuel outlet 18 surrounded by a valve seat 20. Pressure regulator base 16 also includes an annular mounting rim 22 surrounding valve seat 20, and the perimeter 24 of a pressure regulator diaphragm 26 overlies mounting rim 22.

A diaphragm retainer plate 28 supported by diaphragm 26 carries a valve member 30 which cooperates with valve seat 20, and a spring 32 biases diaphragm 26 to engage valve member 30 with valve seat 20. Pressure regulator 10 controls fuel flow past valve seat 20 to balance the fuel pressure in fuel supply member 12 with the bias of spring 32 and thereby maintain substantially constant fuel pressure in fuel supply member 12 and thus in fuel lines 14.

A spring housing 34 surrounds spring 32 and has a flange 36 clamping the perimeter 25 of diaphragm 26 to mounting rim 22.

Both pressure regulator diaphragm 26 and fuel supply member 12 define portions of a fuel pressure chamber 38 which completely surrounds the perimeter 24 of diaphragm 26. It will be appreciated that no fuel will be lost from the fuel supply member 12 in the event of undue distortion of pressure regulator diaphragm 26 which tends to pull its perimeter 24 from between mounting rim 22 and flange 36; fuel does not flow between mounting rim 22 and flange 36 because it would merely move from one portion of chamber 38 to another portion of chamber 38.

A gasket 40 seals the engagement of fuel supply member 12 with pressure regulator base 16, and an O-ring 42 seals the engagement of fuel supply member 12 with spring housing 34.

The embodiments of the invention in which an exclusive property or privilege is claimed are defined as follows:

1. A fuel pressure regulator comprising a pressure regulator base having a fuel outlet, a valve seat surrounding said outlet, and an annular mounting rim surrounding said seat, a diaphragm having its perimeter overlying said mounting rim, said diaphragm defining a portion of a fuel pressure chamber and carrying a valve member for controlling fuel flow past said valve seat from said chamber through said outlet, a spring biasing said diaphragm to urge said valve member toward engagement with said valve seat whereby fuel flow past said valve seat through said outlet is controlled to balance the pressure of the fuel in said chamber on said diaphragm with the bias of said spring, a spring housing surrounding said spring and having a flange clamping the perimeter of said diaphragm to said rim, and a fuel supply member surrounding said rim and sealingly engaging said pressure regulator base and said spring housing to define another portion of said fuel pressure chamber, whereby the perimeter of said diaphragm is completely enclosed in said chamber.

* * * * *